US012545557B2

United States Patent
Gaminde Larreta

(12) United States Patent
(10) Patent No.: US 12,545,557 B2
(45) Date of Patent: Feb. 10, 2026

(54) WIND TURBINE LIFTING ARRANGEMENT

(71) Applicant: Siemens Gamesa Renewable Energy Innovation & Technology S.L., Sarriguren (ES)

(72) Inventor: Beinat Gaminde Larreta, Mundaka (ES)

(73) Assignee: SIEMENS GAMESA RENEWABLE ENERGY INNOVATION & TECHNOLOGY S.L., Sarriguren (ES)

( * ) Notice: Subject to any disclaimer, the term of this patent is extended or adjusted under 35 U.S.C. 154(b) by 208 days.

(21) Appl. No.: 17/918,527

(22) PCT Filed: Apr. 12, 2021

(86) PCT No.: PCT/EP2021/059366
§ 371 (c)(1),
(2) Date: Oct. 12, 2022

(87) PCT Pub. No.: WO2021/209350
PCT Pub. Date: Oct. 21, 2021

(65) Prior Publication Data
US 2023/0159309 A1     May 25, 2023

(30) Foreign Application Priority Data
Apr. 16, 2020 (EP) ..................... 20382306

(51) Int. Cl.
*B66C 23/20*     (2006.01)
*F03D 13/20*     (2016.01)

(52) U.S. Cl.
CPC ............ *B66C 23/207* (2013.01); *F03D 13/20* (2016.05); *F05D 2230/68* (2013.01)

(58) Field of Classification Search
CPC ..... B66C 23/207; B66C 23/185; B66C 1/108; F05B 2230/61; F03D 80/50; F03D 13/10
See application file for complete search history.

(56) References Cited

U.S. PATENT DOCUMENTS

2008/0257844 A1   10/2008   Llorente Gonzalez et al.
2012/0146335 A1*   6/2012   Bywaters ................ F03D 80/82
                                                                      290/55
(Continued)

FOREIGN PATENT DOCUMENTS

CN    202529738 U * 11/2012 ............ B66C 23/10
DK    201970322 A1 * 2/2021 ........... B66C 23/207
(Continued)

OTHER PUBLICATIONS

PCT International Search Report and Written Opinion of International Searching Authority mailed Jul. 16, 2021 corresponding to PCT International Application No. PCT/EP2021/059366 filed Apr. 12, 2021.

*Primary Examiner* — Anna M Momper
*Assistant Examiner* — Nathaniel L Adams
(74) *Attorney, Agent, or Firm* — Schmeiser, Olsen & Watts LLP

(57) ABSTRACT

A wind turbine lifting arrangement includes a tower, a nacelle, a lifting platform and a lifting device attached to the lifting platform for lifting components to be installed in or deinstalled from the nacelle, the nacelle including a main frame attached to a top section of the tower, an attachment portion of the lifting platform being arranged underneath the nacelle and attached to the main frame. The lifting platform includes a lifting device portion provided adjacent to the attachment portion, the lifting device is attached to the lifting platform in the lifting device portion and the lifting device portion and the lifting device are arranged next to a longitudinal side of the nacelle which is one of two opposite longitudinal sides of the nacelle extending along a longitudinal axis of the nacelle and arranged between a top side and bottom side of the nacelle.

11 Claims, 4 Drawing Sheets

(56) References Cited

U.S. PATENT DOCUMENTS

Figure 1:
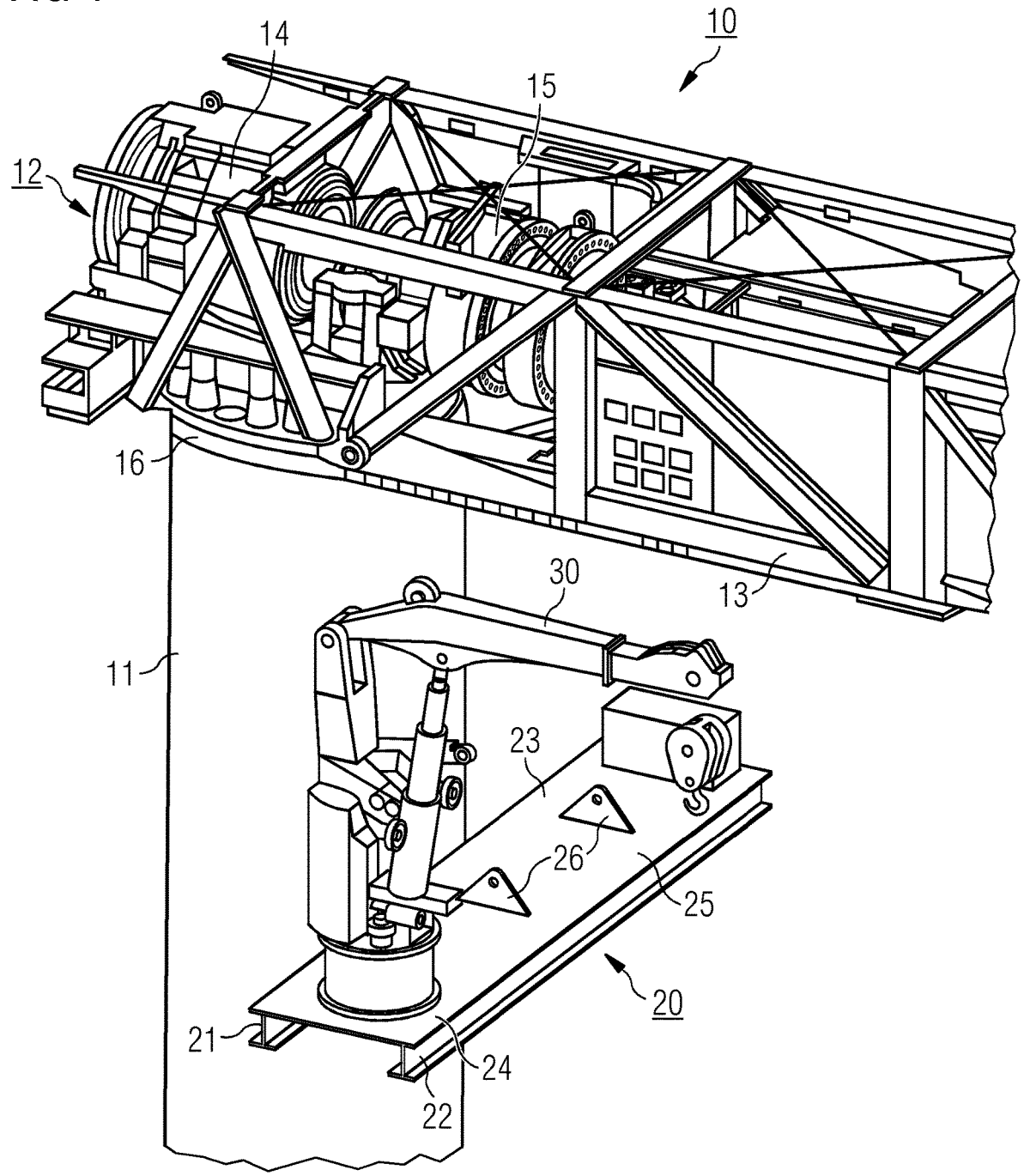

2018/0335023 A1* 11/2018 Trede .................. F03D 9/25
2020/0102193 A1* 4/2020 Strandberg ............ B66C 23/185

FOREIGN PATENT DOCUMENTS

EP          2505541 A1 * 10/2012  ........... B66C 23/207
WO     2019042506 A1     3/2019

* cited by examiner

WIND TURBINE LIFTING ARRANGEMENT

CROSS-REFERENCE TO RELATED APPLICATIONS

This application claims priority to PCT Application No. PCT/EP2021/059366, having a filing date of Apr. 12, 2021, which claims priority to EP Application No. 20382306.7, having a filing date of Apr. 16, 2020, the entire contents both of which are hereby incorporated by reference.

FIELD OF TECHNOLOGY

The following relates to a wind turbine lifting arrangement.

BACKGROUND

To install or deinstall components of the wind turbine in the nacelle of the wind turbine, a lifting device, such as a crane, is necessary to lift the heavy components, such as a generator or a gearbox, of the wind turbine into or out of the nacelle.

In one solution known from the state of the art the lifting device is placed on top or inside of the nacelle and on a top section of the tower. However, to mount the lifting device on top of the nacelle it is typically unavoidable to loosen bolted joints of the nacelle. However, the bolted joints are safety-relevant and thus the loosening of these bolted joints should be avoided. Further, the lifting device placed on top or inside of the nacelle requires or at least obstructs assembly space within the nacelle. Therefore, the operation of the lifting device is typically limited in regard to the components which may be reached and lifted and the movability of the lifting device.

In another solution from the state of the art a lifting platform having the lifting device is attached to the tower. To attach the lifting platform to the tower it is known to provide the lifting platform with grippers for gripping the tower. Thereby, large gripping forces are applied to the tower possibly damaging the tower. Further, the lifting device when operated applies very large compressive loads to the top section of the tower, which may result in a damage to the tower and should be avoided. Also, such a lifting platform is expensive and rather difficult to operate.

U.S. 2018/0335023 A1 describes a nacelle component for a nacelle of a wind turbine having a rotor shaft having a rotational axis. The nacelle component comprises a mainframe module and a power electronics module. The nacelle component has an assembled state wherein said power electronics module is mounted to said mainframe module with a longitudinal axis of said mainframe module being oriented parallel to the rotational axis of the rotor shaft. The longitudinal axis of said power electronics module intersects with a vertical plane that is parallel to the longitudinal axis of said mainframe module.

WO 2019/042506 A1 describes a wind turbine comprising a tower, a nacelle mounted on the tower, and a movable container mounted on a lower part of the nacelle. The movable container is housing a hoisting mechanism for hoisting and/or lowering the movable container and for hoisting and/or lowering wind turbine components.

U.S. 2008/0257844 A1 describes an independent mobile crane system for temporarily use for moving or replacement of components during service operations and during erection of wind turbine generators comprising an auxiliary gantry crane forming a gantry frame conformed to rotate around the nacelle according to a rotation axis. The independent mobile crane system has a hoisting device integrated in the crane system arranged to allow the crane system to be self-hoisting, in that the independent mobile crane system docks to the nacelle via a docking unit and in that the independent mobile crane system is arranged to operate above the nacelle and on the outside of the nacelle sides.

SUMMARY

An aspect relates to provide a wind turbine lifting arrangement not having the disadvantages as mentioned above, such that the lifting device is easy to install at the wind turbine, is operable with ease and high movability and is not applying possibly damaging loads onto the tower.

According to embodiments of the invention, the aspect is solved by a wind turbine lifting arrangement comprising a tower of a wind turbine, a nacelle of the wind turbine being, a lifting platform and a lifting device attached to the lifting platform for lifting components of the wind turbine to be installed in the nacelle or deinstalled from the nacelle, whereby the nacelle comprises a main frame attached to a top section of the tower, and whereby an attachment portion of the lifting platform is arranged underneath the nacelle and attached to the main frame. The lifting platform comprises a lifting device portion provided adjacent to the attachment portion, the lifting device is attached to the lifting platform in the lifting device portion and the lifting device portion and the lifting device are arranged next to a longitudinal side of the nacelle, whereby the longitudinal side of the nacelle is one of two opposite longitudinal sides of the nacelle extending along a longitudinal axis of the nacelle and arranged between a top side and bottom side of the nacelle.

By attaching the lifting platform with is attachment portion underneath the nacelle to the main frame of the nacelle, the bending loads applied to the lifting platform due to operation of the lifting device are transferred to the main frame rather than the tower, whereby the tower is prevented from damage. Further, on the lifting platform, the lifting device is free to move and may be operated with ease. Also, the lifting platform may be easily attached to and detached from the main frame and consecutively the lifting device may be easily attached to the lifting platform. Thereby, in the wind turbine lifting arrangement of embodiments of the invention, the lifting device is easy to install on the lifting platform attached to the main frame of the nacelle, is operable with ease and high movability and is not applying possibly damaging loads to the tower.

The lifting device is arranged next to a longitudinal side of the nacelle. That the lifting device is arranged next to the longitudinal side of the nacelle in particular means that it is arranged opposite of that longitudinal side or, in other words, faces the longitudinal side. The nacelle comprises two opposites longitudinal sides as sides in between the top side and the bottom side of the nacelle and extending along the longitudinal axis of the nacelle. The longitudinal sides are located opposite from one another on the nacelle. Further, they may be arranged parallel to one another. Arranged at the longitudinal side, the lifting device is provided with a particularly high mobility and may access and lift all components in the nacelle.

The lifting platform may in particular extend away with its lifting device portion from the bottom side of the nacelle, where it may be attached with its attachment portion to the main frame. The lifting device may be supported or, in other words, rested on top of the lifting device portion of the lifting platform. The lifting device portion thereby may only be the portion of the lifting platform which extends out of the plane of the nacelle or, in other words, away from the nacelle. The lifting device portion may have an extension of at least 0.5 m, in particular of at least 1 m or at least 2 m, for example. The extension thereby may be such that the lifting device may be safely rested and secured with its dimensions on top of the lifting device portion of the lifting platform.

That the lifting platform is arranged underneath the nacelle in particular means that the lifting platform is arranged at the bottom side of the nacelle. The bottom side of the nacelle is the side facing the ground when the nacelle is supported on the tower. Further, the lifting platform may thereby be arranged facing the tower. Also, the lifting device portion may be extending along the longitudinal axis of the lifting platform. The lifting platform, in particular its lifting device portion, may generally have a plate shape. The lifting device may be supported on top of the lifting device portion or, in other words, rest on the lifting device portion.

It is desirable that the lifting platform extends along its longitudinal axis in a direction transverse, in particular perpendicular, to the longitudinal axis of the nacelle. Thereby, the lifting platform may be attached to the main frame along the entire width of the nacelle such that a very secure attachment is provided.

Further, it is desirable, that the lifting device portion comprises a carriage for the lifting device. Moreover, it is desirable, that the carriage is configured slidable such that the lifting device can be moved along the lifting platform and closer to or further away from the nacelle. Thereby, the lifting device can be positioned optimally with respect to the nacelle.

Also, it is desirable, that the lifting platform comprises two beams attached to the main frame. The beams give structural support to the lifting platform and may be easily attached to the main frame by means of bolted joints, for example. The beams may be designed as I-beams, for example.

Therein, it is desirable, that the two beams are arranged parallel to one another. Thereby, even distribution of bending loads from the lifting device along the two beams of the lifting platform and the main frame may be achieved.

Further, therein, it is desirable, that the lifting device is attached to a carrying structure of the lifting platform connecting the two beams with each other. The carrying structure is secured to the two beams and allows for carrying the weight and bending loads of the lifting device to the main frame via the two beams. The carrying structure may comprise the lifting device portion and/or the attachment portion of the lifting platform.

Also, therein, it is desirable, that the carrying structure is designed as a carrying plate. Thereby, the design of the lifting platform is thin and lightweight.

It is desirable, that the lifting platform comprises a support structure arranged underneath the lifting device, the support structure extending parallel to the tower and the support structure being arranged to be pressed against the tower when the lifting device is loaded with a component of the wind turbine. The support structure prevents that excessive bending loads are applied to the lifting platform and transferred therefrom to the main frame which may be harmful to the lifting platform and the main frame. Instead, a portion of the bending loads introduced into the lifting platform, when the lifting device is loaded and rotated, is shifted to the tower. However, contrary to the solutions in the state of the art, these are not applied to the top portion of the tower but instead, in particular evenly, distributed at an upper portion of the tower along the length of the tower by means of the support structure due to its extension along the tower. The top portion of the tower has the top side of the tower whereas the upper portion is a portion of the tower next to the top portion and extending downwards along the tower but not having the top portion, i.e. the top side. The support structure may be attached to the lifting platform, in particular the two beams, and/or to the lifting device. The support structure may be arranged resting on the tower, in particular on the upper portion of the tower.

Therein, it is desirable, that the support structure has a concave side corresponding to and facing a rounded shape of the tower. Thereby the concave side of the support structure is forced against the rounded shape of the tower when the support structure is pressed against the tower when the lifting device is loaded and rotated with a component of the wind turbine. The support structure may in particular be arranged to form-fit with its concave side to the tower. The portion of bending loads shifted to the support structure may therefore be transferred to the tower in a particular even manner.

Further, therein, it is desirable, that the support structure is designed as an elongate body. For example, the elongate body may be a cylinder. Thereby, the support structure may distribute the portion of the bending loads over a large length of the tower.

Also, it is desirable, that the attachment portion of the lifting platform is arranged at or within 5 m distance, in particular within 2 m distance, to the tower. Thereby the path of the bending loads from the lifting platform via the main frame to the tower is kept small and possible damage of the tower is prevented.

BRIEF DESCRIPTION

Figure 2:
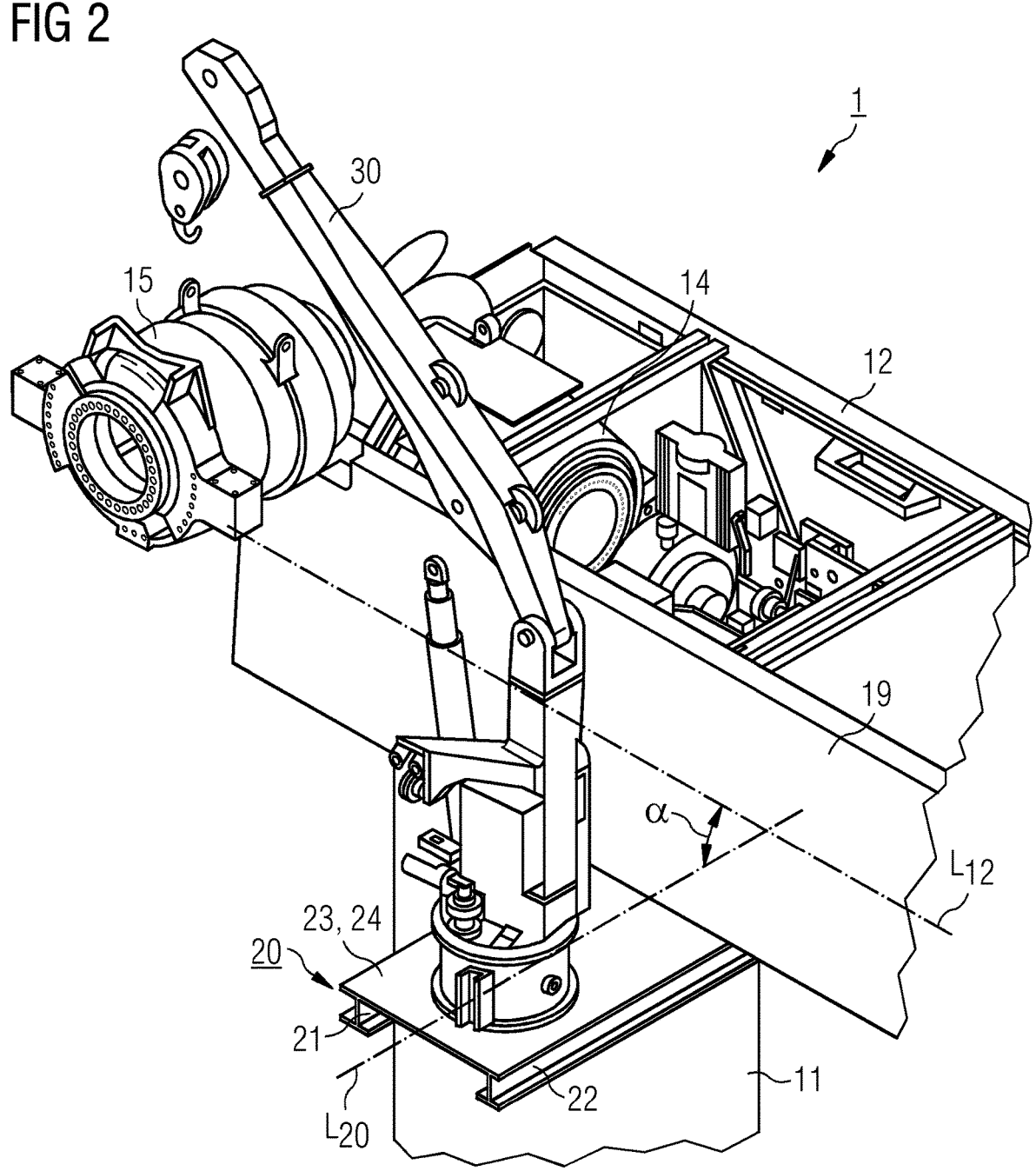
Figure 3:
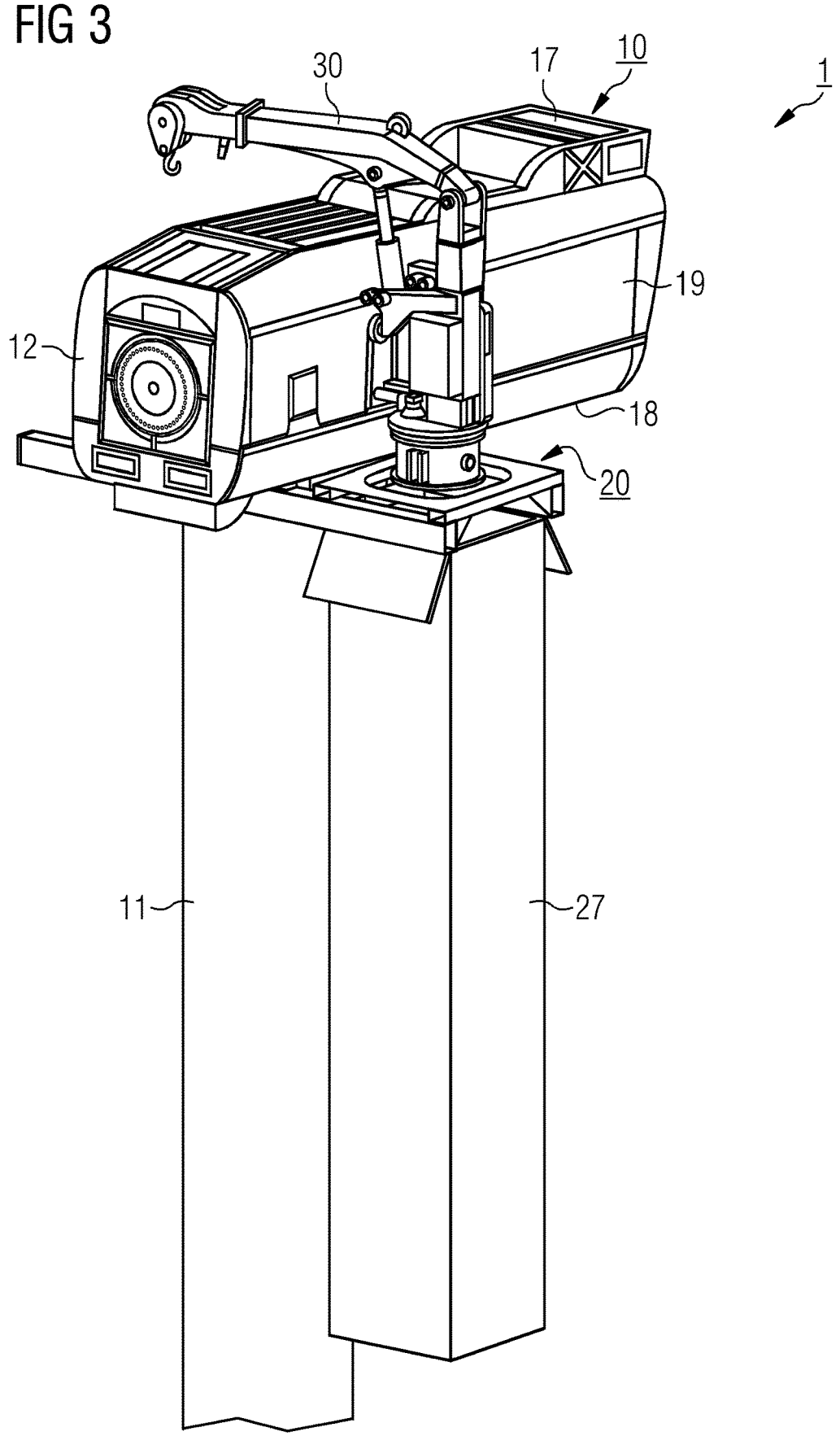
Figure 4:
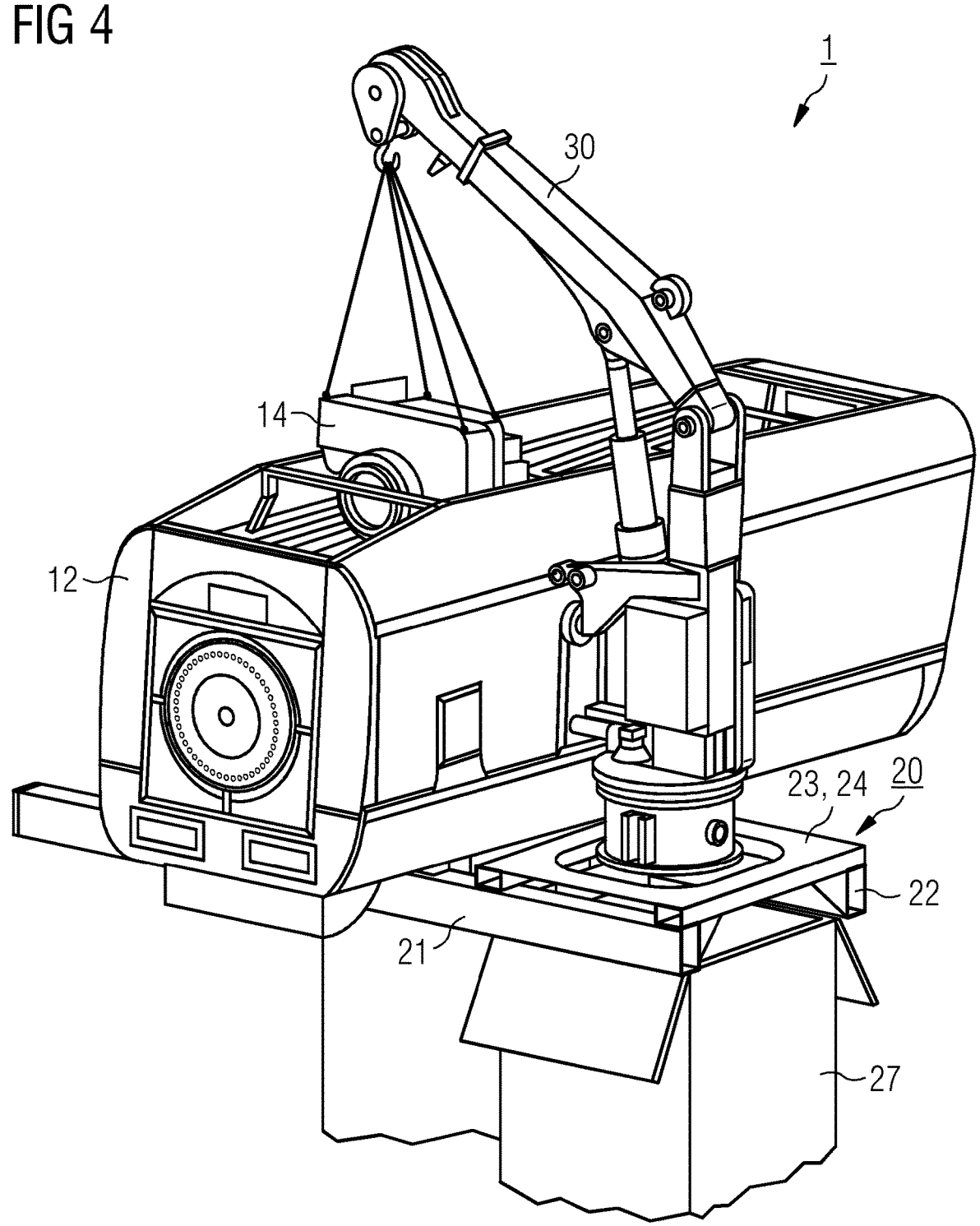

Some of the embodiments will be described in detail, with reference to the following figures, wherein like designations denote like members, wherein:

FIG. 1 a side perspective view on the operation of installing a lifting device at a wind turbine;

FIG. 2 a side perspective view on a wind turbine lifting arrangement according to a first embodiment of the invention as installed according to FIG. 1;

FIG. 3 a side perspective view on a wind turbine lifting arrangement according to a second embodiment of the invention; and FIG. 4 a side perspective view on the wind turbine lifting arrangement of FIG. 3 in operation of its lifting device.

DETAILED DESCRIPTION

FIG. 1 shows a side perspective view on the operation of installing a lifting device 30 at a wind turbine 10 to be installed.

The wind turbine 10 comprises a tower 11 and a nacelle 12. The nacelle 12 has a main frame 13 as a structure supporting components 14, 15 of the wind turbine 10 inside of the nacelle 12 and resting on a top side of a top portion 16 of the tower 11. In FIG. 1, the components 14, 15 exemplary denominated inside the nacelle 12 are a main shaft 14 and a gearbox 15.

A lifting platform 20 carrying the lifting device 30 is to be arranged underneath the nacelle 12 or main frame 13 or, in other words, on a bottom side of the nacelle 12. For this purpose, the lifting platform 20 comprises two eyelets 26 for lifting the lifting platform 20 towards the nacelle 12, where the lifting platform 20 may be attached to the bottom side of the nacelle 12, i.e. to the main frame 13. The lifting platform 20 may be attached to the main frame 13 by means of bolted joints, for example.

The lifting platform 20 comprises two beams 21, 22. The beams 21, 22 are arranged parallel to one another and connected with each other by means of a carrying structure 24. The carrying structure 23 has the two eyelets 26 on a top side thereof. Here, the carrying structure 23 is designed as a carrying plate.

Further, the carrying structure 23 comprises an attachment portion 25 for attachment to the main frame 13. The attachment portion 25 is covered by the nacelle 12 when looked from the top and down to the nacelle 12 and the lifting platform 20, as can be seen in FIG. 2. Also, the carrying structure 23 comprises a lifting device portion 24, in which the lifting device 30 is installed. The lifting device 30 may be installed after lifting the lifting platform 20 first and consecutively lifting the lifting device 30 second, for example by means of an auxiliary lifting device (not shown) installed on the nacelle 12. The auxiliary lifting device may be smaller in size and lighter in weight such that it may not be able to lift the heavy components 14, 15 of the wind turbine 10 but the lifting platform 20 and the lifting device 30, which may be larger in size and heavier such that it may be able to lift the heavy components 14, 15 of the wind turbine 10. When the lifting device 30 is lifted to the lifting platform 20, the lifting device 30 is installed in the lifting device section 24 of the lifting platform 20.

FIG. 2 shows a side perspective view on a wind turbine lifting arrangement 1 according to a first embodiment of the invention as installed according to FIG. 1.

Here, it can be seen that the lifting device 30 is installed on the lifting platform 20 such that the lifting device 30 is arranged next to a longitudinal side 19 of the nacelle 12. The longitudinal side 19 is a side transverse, in particular perpendicular, to the top side 17 and/or bottom side 18 of the nacelle 12 and/or ground. The lifting platform 20 extends with its lifting device portion 24 from underneath the nacelle 12 along its longitudinal axis $L_{20}$ traverse to the nacelle 12. In particular, an angle α is formed between the longitudinal axis $L_{20}$ of the lifting platform 20 and the longitudinal axis $L_{12}$ of the nacelle 12. The angle α may be in the range of 80° to 100°, in particular 85° to 95°, for example. In this case, the angle α is 90° so that the lifting platform 20 is arranged perpendicular to the nacelle 12.

In FIG. 2, the lifting device 30 is shown lifting a component 15 of the wind turbine 10, in this case the gearbox 15. This may be done for installing the gearbox 15 inside of the nacelle 12 or removing it therefrom for replacement or service.

FIG. 3 shows a side perspective view on a wind turbine lifting arrangement 1 according to a second embodiment of the invention.

According to this second embodiment, a support structure 27 is arranged underneath the lifting device 30. The support structure 27 is designed as an elongate weighted body and extends along its longitudinal extension in parallel to an upper section of the tower 11. The support structure 27 is arranged next to the tower 11 or in contact with the tower 11 such that it is pressed against the tower 11 when the lifting device 30 is loaded with a component 14, 15 of the wind turbine 10. Thereby, the bending loads applied to the lifting platform 20 due to operation of the lifting device 30 are in part shifted to the support structure 27 transferring them to the tower 11.

The support structure 27 has a concave side corresponding to and facing the rounded shape of the tower 11. However, the concave side is covered by the support structure 27 in this perspective.

FIG. 4 shows a detailed side perspective view on the wind turbine lifting arrangement 1 of FIG. 3 in operation of its lifting device 30. Here, the lifting device 30 is lifting a component 14 of the wind turbine 1, which may be the main shaft 14.

Although the present invention has been disclosed in the form of embodiments and variations thereon, it will be understood that numerous additional modifications and variations could be made thereto without departing from the scope of the invention.

For the sake of clarity, it is to be understood that the use of "a" or "an" throughout this application does not exclude a plurality, and "comprising" does not exclude other steps or elements.

The invention claimed is:

1. A wind turbine lifting arrangement comprising:
a tower of a wind turbine;
a nacelle of the wind turbine;
a lifting platform; and
a lifting device attached to the lifting platform for lifting components of the wind turbine to be installed in the nacelle or deinstalled from the nacelle, whereby the nacelle comprises a main frame attached to a top section of the tower, and whereby an attachment portion of the lifting platform is arranged underneath the nacelle and attached to the main frame such that bending loads from the lifting device are transferred to the main frame rather than the tower;
wherein the lifting platform comprises a lifting device portion provided adjacent to the attachment portion, the lifting device is attached to the lifting platform in the lifting device portion on only one longitudinal side of the nacelle, whereby the longitudinal side of the nacelle is one of two opposite longitudinal sides of the nacelle, the longitudinal side of the nacelle extending along a longitudinal axis of the nacelle and arranged between a top side and bottom side of the nacelle;
wherein the lifting platform extends along a longitudinal axis in a direction transverse to the longitudinal axis of the nacelle;
wherein the lifting platform comprises beams attached to the main frame.

2. The wind turbine lifting arrangement according to claim 1, wherein, the lifting device portion comprises a carriage for the lifting device.

3. The wind turbine lifting arrangement according to claim 2, wherein the carriage is configured slidable such that the lifting device is moved along the lifting platform and closer to or further away from the nacelle.

4. The wind turbine lifting arrangement according to claim 1, wherein the beams include two beams arranged parallel to one another.

5. The wind turbine lifting arrangement according to claim 1, wherein the lifting device is attached to a carrying structure of the lifting platform connecting the beams with each other.

6. The wind turbine lifting arrangement according to claim 5, wherein the carrying structure is designed as a carrying plate.

7. The wind turbine lifting arrangement according to claim 1, wherein the lifting platform comprises a support structure arranged underneath the lifting device, the support structure extending parallel to the tower and the support structure being arranged to be pressed against the tower when the lifting device is loaded with a component of the wind turbine.

8. The wind turbine lifting arrangement according to claim 7, wherein the support structure has a concave side corresponding to and facing a rounded shape of the tower.

9. The wind turbine lifting arrangement according to claim 7, wherein, the support structure is designed as an elongate body.

10. The wind turbine lifting arrangement according to claim 1, wherein, the attachment portion of the lifting platform is arranged at or within 5 m distance to the tower.

11. The wind turbine lifting arrangement according to claim 1, wherein the attachment portion of the lifting platform is directly attached to the main frame via the beams.

* * * * *